Jan. 25, 1949.    E. V. MURPHREE    2,459,836
CONTROLLING REACTION TEMPERATURES
Filed Dec. 11, 1942    3 Sheets-Sheet 1

FIG.—1

Jan. 25, 1949. E. V. MURPHREE 2,459,836
CONTROLLING REACTION TEMPERATURES
Filed Dec. 11, 1942 3 Sheets-Sheet 3

Patented Jan. 25, 1949

2,459,836

UNITED STATES PATENT OFFICE 2,459,836

CONTROLLING REACTION TEMPERATURES

Eger V. Murphree, Summit, N. J., assignor to Standard Oil Development Company, a corporation of Delaware Application December 11, 1942, Serial No. 468,630

3 Claims. (Cl. 23—1)

This invention relates to a process for controlling the temperature of chemical reactions and pertains more particularly to a method of and apparatus for adding or extracting heat from a reaction zone and for maintaining the temperature within said zone within extremely narrow limits.

The invention finds particular application in reactions carried out at high temperatures and wherein strong heat effects are produced by the reaction, such as in highly exothermic or highly endothermic reactions. Highly exothermic or endothermic reactions carried out at high temperature levels involve difficult problems of temperature control. At lower operating temperatures, regulation or control of temperature may be obtained by a liquid heat exchange medium which may be maintained at a temperature close to the temperature desired for the reaction. This heat exchange medium may be kept in heat exchange relationship with materials undergoing reaction, so that the liquid serves as a thermostat or reservoir for maintaining a close temperature control. For example, it has been a practice to carry out chemical reactions in tubes or other reaction zones immersed in a bath of molten salts and high-boiling organic liquids. While such liquid materials operate satisfactorily at moderately high temperatures, such as temperatures up to about 800° F., molten salt mixtures normally used for this purpose are not capable of operating satisfactorily at higher temperatures, such as temperatures above 900° F.

One of the primary objects of the present invention is to provide an improved process for supplying or extracting heat from a reaction zone.

Another object of the invention is to provide an improved process for controlling reaction temperatures carried out at a high temperature level.

Another important object of the invention is to provide an improved process and apparatus for controlling high temperature reactions within closely confined temperature limits.

Other more specific objects of the invention will be apparent from a detailed description hereinafter.

In accordance with the broader phases of the present invention, a fluidized solid is employed as a heat exchange medium in place of a liquid for adding or extracting heat from a reaction zone. The fluidized solid may be operated successfully at much higher temperatures than in the case of liquid media heretofore employed. The fluidized solid, which forms a heat exchange medium according to the broader phases of the invention, comprises finely divided solids intermixed with a small amount of a gaseous agent, the amount of such gaseous agent being regulated to maintain the solid in a mobile, ebullient state. Under properly controlled conditions, the fluidized solid will tend to seek its own level and otherwise behave in many respects as a liquid. This material is particularly suitable as a heat exchange medium for high temperature operations in which it is desired to maintain a close temperature control of the reaction.

According to one of the more specific phases of the invention, a relatively large body or bath of fluidized material is maintained in intimate heat exchange relationship with the substances undergoing reaction, so that the body of fluidized material is capable of absorbing or liberating relatively large amounts of heat with relatively little change in temperature. When operating in this manner, the relatively large body or bath of fluidized solid serves as a thermostat or heat reservoir to maintain the reaction temperature within closely confined limits. For example, any unexpected surge in heat evolved or liberated during the reaction may be absorbed by the relatively large bath of fluidized solid heat exchange medium with only a relatively small increase in temperature. Conversely, any unexpected loss of heat input during the reaction will be overcome by extracting heat from the fluidized mass of solids with only a small drop in temperature of the fluidized mass.

This is particularly important in cases where uniform temperatures during the reaction are required. For example, in hydrocarbon reactions, in which the present invention finds particular application, the temperature in many cases determines to a large extent which of the many possible types of reactions will predominate. To be more specific, one temperature level may cause a polymerizing reaction to predominate, whereas at another level an entirely different type of reaction, such as cracking, dehydrogenation, or the like, may predominate.

In accordance with the preferred embodiment of the present invention, the dense, fluidized solid heat exchange medium is maintained in direct contact with the substances undergoing reaction. When carrying out gas or vapor phase reactions, the reaction gases may be passed through the dense, fluidized mass, as described more particularly in Fig. 1 hereinafter. In such cases the gaseous reagents may serve in whole or in part for maintaining the solid in a mobile, fluidized state.

When operating in this manner, it is also preferred to control the velocity of the gases passing through the finely divided solid material so that the fluidized solid is maintained in a dense, turbulent condition. The turbulent character of the mass so produced will prevent any substantial variation in the temperature throughout the mass.

The velocity of the gases required to maintain the solids in a dense, turbulent, fluidized state will depend upon the size and density of the solid particles, the viscosity of the gases, and other factors. For example, when employing a solid having a bulk density of about 35 to 50 lbs. per cubic foot and having a particle size between 1 and 100 microns, the velocity of the gases may be of the order of from 0.5 to 5.0 feet per second. With larger or more dense solid materials, the velocity may be greater.

In order to supply or extract heat from the reaction zone during the reaction, a portion of the fluidized solids may be continuously withdrawn and passed through a heat exchanger in which the solid may be either heated or cooled, depending upon the character of the reaction involved. After modifying the temperature of the solids, they may then be returned to the reaction zone. Instead of continuously withdrawing a portion of the fluidized mass and modifying the temperature externally of the reaction zone, the reaction chamber may be provided with heating or cooling elements so as to maintain the temperature at the required level.

A wide variety of different types of solids may be used as the heat exchange medium, such as metal or metal alloy powders, refractory material, such as silica in the form of powdered quartz, fine sand, finely divided silica gel, alumina which may be in the form of powdered alundum, fused alumina, activated alumina or finely divided alumina gels, clays of various types, and other refractory metallic and non-metallic oxides. In cases where the finely divided heat exchange medium is maintained in direct contact with the reagents undergoing reaction, it is important to provide a solid material which is stable under the operating temperature conditions.

In cases where the solids or solid materials enter into the reaction, the solid reactant may be intermixed with the solid heat exchange medium, or the solid reactant itself may be employed in finely divided state as a heat exchange medium.

Where the fluidized solid heat exchange medium is in direct contact with the reacting substances, the solid or solids may form a catalyst for carrying out the reaction, or a solid catalyst for the reaction may be intermixed with the solid heat exchange material.

As before mentioned, the invention finds wide application and is particularly suitable for reactions carried out at high temperature levels and wherein it is desired to maintain an extremely close temperature control of the reaction. For example, the invention finds application in various hydrocarbon reactions, such as oil cracking, dehydrogenation, hydrogenation, polymerization, alkylation, isomerization, cyclization, and more complex reactions involving one or more of the above reaction, such as dehydropolymerization, dehydrocyclization, and the like. The invention also finds application in a wide variety of organic and inorganic reactions, such as oxidation, reduction, hydration, dehydration, chlorination, nitration, sulfation, ore roasting and reduction, and calcination.

One type of reaction in which the invention finds particular application is the conversion of methane into higher molecular weight hydrocarbons. This conversion, for example, may involve partial dehydrogenation of the methane to form free methyl radicals followed by the polymerization of the radicals into higher molecular weight products, or oxidation or chlorination of the methane followed by dehydration or dechlorination. In such operations the hydrogen may be extracted from the methane as such or the methane may be caused to react with a hydrogen acceptor. Of the various types of hydrogen acceptors, free oxygen is the most feasible from a practical viewpoint. This reaction, however, of methane with oxygen to eliminate partially the hydrogen evolves large quantities of heat and since the reaction itself requires relatively high temperatures, such as from 300° C. to 500° C., control of temperature is particularly difficult. A further process in which the invention finds particular application is in the conversion of butene to butadiene, or the formation of diolefins from mono-olefins. These reactions normally require relatively high temperatures, such as of the order of from 1100° F. to 1400° F., and extremely short contact periods. Furthermore, it is necessary in such operations to maintain extremely close temperature control over the reaction.

For a better understanding of the invention, reference will now be made to the accompanying drawings wherein.

Figure 1:
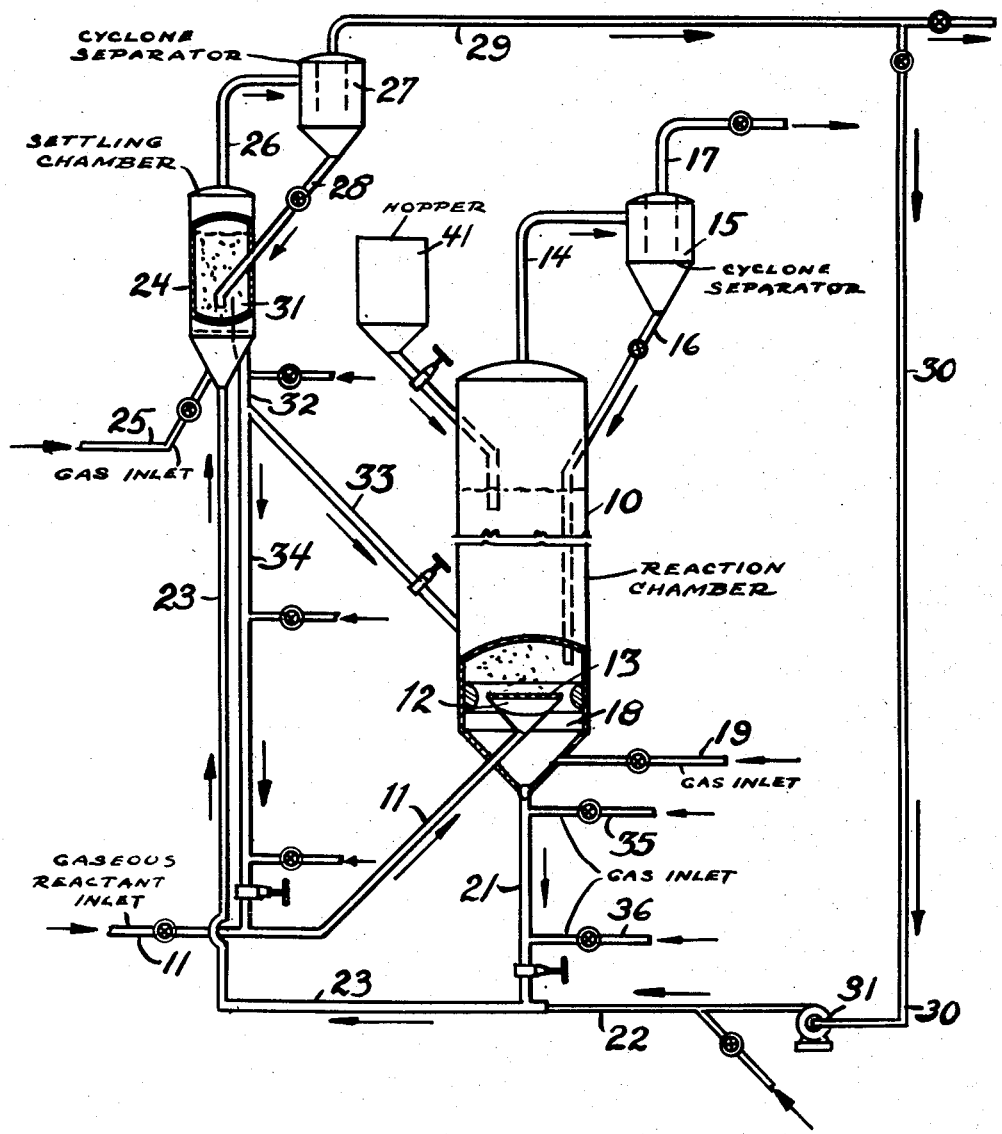
Fig. 1 is a diagrammatic illustration of one form of apparatus capable of carrying the process into effect.

Referring particularly to Fig. 1, the reference character 10 designates a reaction chamber in which the various types of reactions hereinbefore described may be carried out. This reaction chamber contains a mass or bath of finely divided solids through which passes a gaseous fluidizing agent so as to maintain the solids in a turbulent, mobile, fluidized condition. The type of apparatus illustrated in Fig. 1 is adapted particularly for carrying out vapor phase reactions and in which at least one of the reactants is in the form of vapor. In such cases the gaseous reactant is introduced into the system through line 11 which enters the bottom portion of the reactor and terminates in a distributing cone 12 having a perforated grid plate 13 at the top thereof through which the gaseous materials pass into the finely divided solid material contained in the reaction zone. The velocity of the gases passing upwardly through the fluidized mass of solid material within the reaction zone 10 is controlled, as previously described, to maintain the solid material in a dense, fluidized condition. Under carefully controlled conditions, a dense, fluidized mass is maintained in the bottom portion of the reactor which is separated from a dispersed phase in the upper portion of the reactor by a reasonably definite level or meniscus, as illustrated in Fig. 1.

As previously described, the heat evolved during the course of the reaction is absorbed by the solid, finely divided, fluidized material within the reaction chamber 10. The amount of fluidized solids within the reactor should be controlled with respect to the amount of reactants passing therethrough so that any normal fluctuation in heat effect occurring during the reaction may be absorbed by the bath with only a slight change in temperature.

The gaseous reaction products after passing upwardly through the reaction chamber 10 are removed overhead through line 14 which may lead to a cyclone separator 15 or other suitable separating device for removing entrained powder from the reaction gases. Entrained powder so separated may be returned to the reaction chamber 10 through line 16. The reaction vapors after passing through the separator 15 are removed from the system through line 17 and may be treated as required to recover the desired products therefrom.

As illustrated in Fig. 1, the distributing cone 12 is spaced above the bottom of the reaction chamber 10 to form a settling zone 18 and is also spaced from the outer wall of the reaction chamber 10 so as to form an annular passage through which a portion of the finely divided solid material may continuously discharge into the settling zone located below the distributing cone 12. If desired, a gaseous agent may be introduced into the settling zone through line 19 to strip the finely divided material of reaction gases. Finely divided solid material collected in the settling zone 18 is removed therefrom through conduit 21 and is introduced into a stream of gases passing through line 22. These gases may form a part of the reaction gases or they may be a heating or cooling gas, as the case requires. The suspension of powder and gases formed in the line 22 may be then passed through line 23 into the bottom portion of a settling chamber 24. The bottom portion of this chamber is preferably in the form of an inverted cone and a perforated grid plate may be provided at the upper end of the cone for distribution of the suspension into the chamber 24.

The diameter of the chamber 24 is designed to reduce the velocity of the suspension passing therein to such a point as to permit the solid material within the suspension to separate into a dense, fluidized mass similar to that within the reaction chamber 10. Under such conditions, the bulk of the solid material, amounting to from 90% to 99% of the solids, may be separated from the gases passing through the chamber 24. The chamber 24 may serve simply as a settling zone for separation of the solids from the gases, or it may serve as a heating or cooling zone for adding or extracting heat from the finely divided heat exchange medium. For example, as previously mentioned, the finely divided material passing from the conduit 21 into the gas stream 22 may be cooled or heated to the required temperature. In this case, the chamber 24 may serve simply as a separating zone for effecting major separation of the solids from the heating or cooling gas. When utilizing the chamber 24 as a heating zone for heating the finely divided material, a heating gas from an extraneous source may be introduced through line 25. In some cases, a fuel may be introduced through line 25 and air for combustion of the fuel may be introduced through line 22 so that the finely divided material in the chamber 24 is heated by direct combustion of the fuel. In other cases, a liquid quenching or cooling medium may be introduced into the reaction chamber through line 25 when it is desired to reduce the temperature of the solids prior to return to the reaction chamber. The carrier gas used for carrying the finely divided solids into the reaction chamber 24 passes upwardly therethrough and is removed overhead through line 26 and may be passed to a cyclone separator 27 or other suitable separating device for removing entrained solids therefrom. The solids so separated may be returned to the chamber 24 through line 28. The carrier gas after passing through suitable separating device such as cyclone separator 27 may be removed from the system through line 29 or a portion thereof may be recycled through line 30 and compressor 31 and again used for carrying the powder into the chamber 24.

In some cases, instead of directly heating or cooling the material in the chamber 24, heating or cooling elements may be imbedded in the fluidized mass within chamber 24 for adding or extracting heat from the material.

The reaction chamber 24 is provided with a pocket or compartment 31 located adjacent the outer wall in which a portion of the mass continuously collects. The bottom of the compartment 31 discharges into a vertical conduit 32 which may lead back to the reaction chamber 10 through line 33 or through line 34 into the line 11 through which the gases to be reacted are passed.

In order to effect the circulation as above described, it is important to maintain the finely divided material in a freely flowing fluidized state throughout its circulating path. To this end, a small amount of aerating gas may be introduced into the vertical conduit 21 leading from the reaction chamber 10 through lines 35 and 36. A similar fluidizing gas may be introduced at one or more spaced points along the vertical conduits 32 and 34 and 32 and 33. By maintaining the solid in a freely flowing state throughout its path of travel, the powdered material from the chamber 24 may be fed by gravity into the reaction chamber 10. By maintaining the material in the conduits 32, 33, 34 and 21 in a freely flowing fluidized state, a hydrostatic or fluistatic pressure develops at the base of these conduits. This pressure is preferably utilized for restoring pressure on the finely divided solid material being circulated through the system sufficient to overcome the friction or pressure drops through the circulating system. To this end, the height of the conduits should be sufficient to develop adequate pressure for overcoming the pressure drop in the circulating system.

When operating according to the modification illustrated in Fig. 1, the gases undergoing reaction are maintained in direct contact with the finely divided fluidized solids. In cases where the solids themselves form a portion of the reactants, the solids should be in finely divided state and may be discharged through a hopper 41. Also, additional heat exchange solids may be discharged into the reaction chamber 10 through hopper 41 to make up for any powder lost during circulation of the gases through the separating devices.

Figure 2:
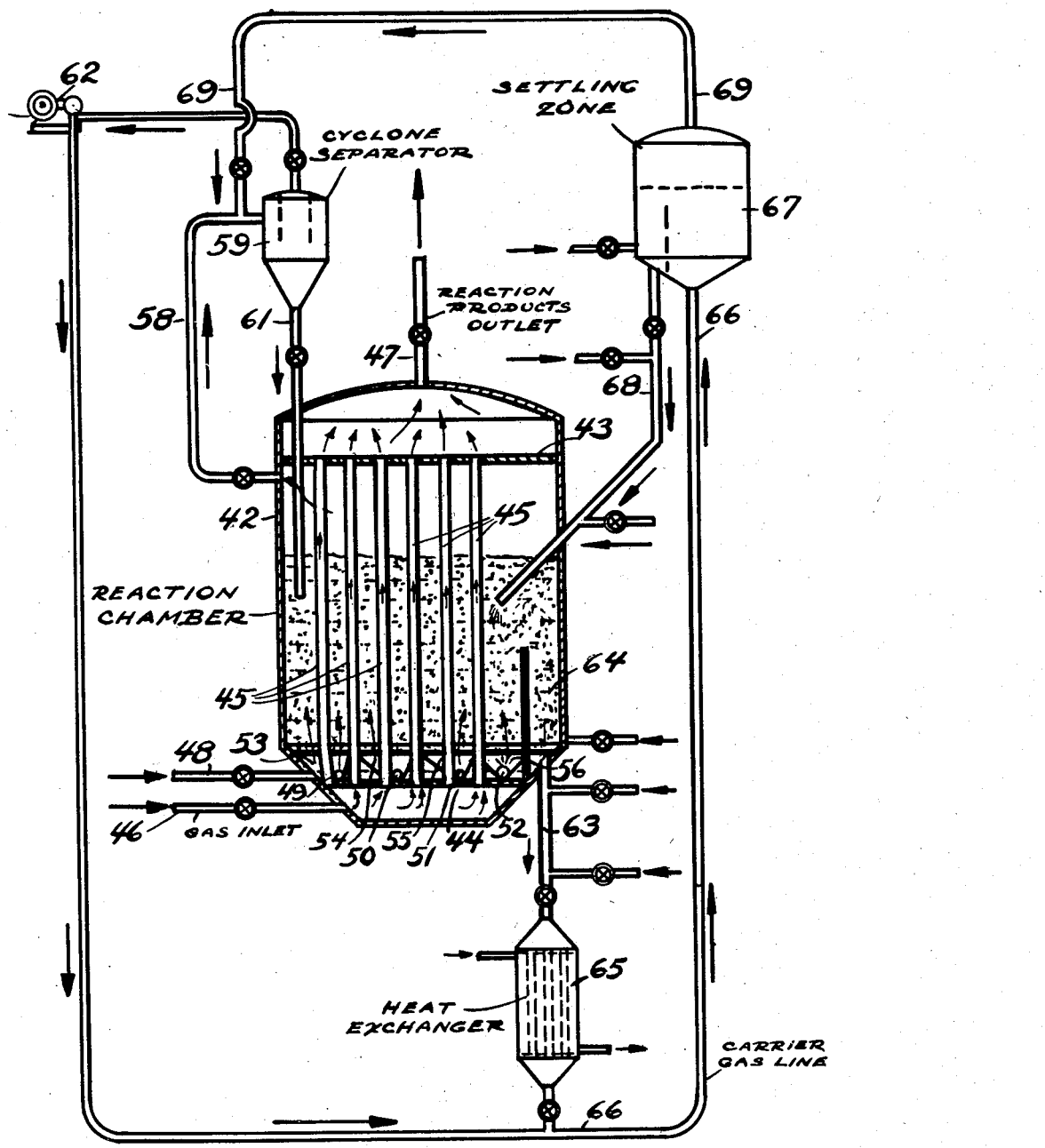
Fig. 2 is a modified form of apparatus showing parts in section capable of carrying the process into effect.

Fig. 2 illustrates a further modification of the invention in which the fluidized solid forms a bath surrounding tubes or other retorts in which the reaction takes place. In other words, Fig. 2 illustrates an apparatus in which the heat exchange is accomplished by indirect heat exchange relationship between the finely divided solids and the reaction gases.

Referring more particularly to Fig. 2, the reference character 42 designates the outer shell of a reaction chamber. A header 43 is provided in the upper portion of the reaction chamber and a lower header 44 is provided in the bottom portion. These two headers are interconnected with a plurality of reaction tubes 45. Gases or liquid to be reacted may be introduced into the bottom header 44 through line 46 and thence pass upwardly through the reaction tubes 45 into the upper header 43 from whence the reaction products are removed through line 47. Surrounding the reaction tubes and within the outer shell 42 is maintained a dense, fluidized mass of finely divided solid heat exchange medium. The gases required to maintain the solid in freely flowing, turbulent, fluidized state are introduced through line 48. The line 48 may be provided with a plurality of branch lines 49, 50, 51 and 52 extending transversely across the reaction chamber above the bottom header 44. The branch lines 49 to 52, inclusive, are provided with perforations from which the fluidizing or aerating gas discharges into a plurality of parallel trough-shaped distributing zones 53, 54, 55 and 56. These trough-shaped distributing zones are indicated more clearly in the broken sections of Fig. 2. The upper portion of the distributing zones 53 to 56, inclusive, is provided with a perforated grid through which the fluidized gases pass into the main body of the chamber around the reaction tubes.

The velocity of the gaseous fluidizing agent introduced into the main body of the chamber is controlled, as previously described in connection with Fig. 1, to maintain the solid material in a dense, fluidized, turbulent condition. The amount of fluidized solids maintained within the outer shell 42 is preferably large as compared with the weight of gases in the reaction zone, so that the fluidized bath is capable of absorbing relatively large quantities of heat with only a small rise in temperature, as described in connection with Fig. 1. The fluidizing gas after passing through the fluidized bath of solid material surrounding the reaction tubes 45 is removed from the upper section of the shell through line 58 and may be passed to a cyclone separator 59 or other suitable separating device for removal of the solids therefrom. The gases after passing through the cyclone separator 59 may be rejected from the system or they may be compressed and recycled to the distributing chambers 53 to 56, inclusive, through line 61' and compressor 62.

In order to add or extract heat from the finely divided heat exchange medium within the outer shell 42, a portion of the fluidized material may be continuously removed therefrom through line 63 leading from a pocket or compartment 64 located adjacent one side of the outer shell 42. The finely divided solid material withdrawn from the chamber is passed through conduit 63 into a suitable heat exchanger 65 in which the temperature is modified by adding or extracting heat within the heat exchanger 65. The solids after passing through heat exchanger 65 may discharge into a stream of carrier gas 66 and may be carried to a settling zone 67 constructed similar to the settling chamber 24 shown in Fig. 1. Within the settling chamber 67 the velocity of the gases is reduced to permit separation of the finely divided solid into a dense, fluidized mass. A portion of the fluidized solids in the settling chamber 67 may be removed through line 68 and returned to the reaction chamber. Carrier gas after passing through the settling chamber 67 is removed overhead through line 69 which may merge with line 58 passing to the cyclone separator 59 for removal of entrained solids within the cyclone separator 59.

Instead of heating or cooling the finely divided solid material externally of the reaction chamber, as illustrated in Fig. 2, heating or cooling elements may be positioned directly within the outer shell 42 of the chamber to maintain the desired temperature. Furthermore, instead of using a heat exchanger 65, as shown in Fig. 2, the settling chamber 67 may serve either as a heating or cooling chamber in the same way as previously described with respect to the chamber 24 in Fig. 1.

Figure 3:
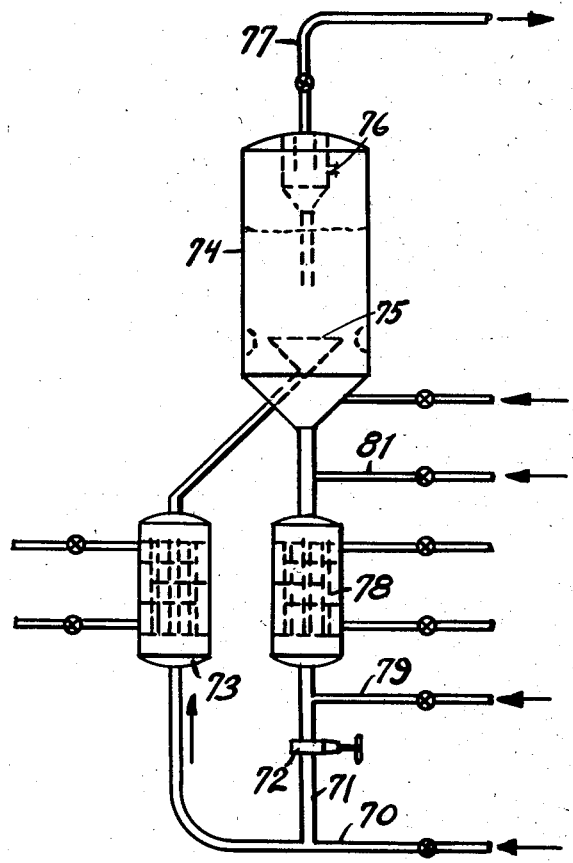
Fig. 3 is a diagrammatic illustration of a simplified form of apparatus suitable for carrying the invention into effect.

Fig. 3 illustrates a simplified form of equipment wherein the gases or vapors to be reacted are utilized for circulating the finely divided heat exchange medium through external heat exchangers.

Referring particularly to Fig. 3, the material to be reacted is introduced into the equipment through line 70 wherein it intermixes with finely divided solid heat transfer medium discharging through a standpipe 71 having a control valve 72. The resulting mixture of finely divided solid material together with the gases to be reacted may then pass through an external heat exchanger 73 in which heat may be added or extracted as the case requires. The resulting mixture may then discharge into a reaction chamber 74 through distributing cone 75 similar to that illustrated in Fig. 1. The velocity of the reaction gases passing upwardly through the reaction chamber 74 is controlled to maintain the solid material in a dense, fluidized condition, as also described with reference to Fig. 1.

The gaseous reaction products after passing through the fluidized bed of solid material within the reaction chamber 74 may pass to a cyclone separator 76 positioned in the top of the reaction chamber 74. Entrained solid material separated in the cyclone separator 76 may be returned to the fluidized bath of solid material within the reaction chamber 74. The gaseous reaction products after passing through the cyclone separator 76 may be removed through line 77 and passed to suitable equipment for recovery of desired products therefrom.

A portion of the fluidized solid material within the reaction chamber 74 continuously gravitates through the annular passage formed between the distributing cone 75 and the outer shell of the reaction chamber into the bottom section of the reaction chamber below the cone. A stripping gas or other fluidizing medium may be introduced at one or more spaced points in the bottom section of the reaction chamber to remove gaseous reaction products from the solid material. The solid material continuously discharges from the bottom portion of the reaction chamber 74 into the standpipe 71 previously mentioned. This standpipe may, if desired, contain a heat exchanger 78 for modifying the temperature of the solid material prior to intermixing the same with the gases to be reacted.

While two heat exchangers have been illustrated, one in the standpipe and the other in the gas line leading to the reactor, it will be understood that either one of the two may be omitted, if so desired.

An aerating or fluidizing gas may be introduced at one or more spaced points in the standpipe 71 through lines 79 and 81.

It will be noted that Fig. 3 illustrates an extremely simple form of equipment in which a reaction may be carried out in the presence of a large bath of fluidized solid heat exchange medium capable of maintaining a close temperature control over the reaction and wherein the solid heat exchange medium is maintained at the desired temperature by circulation through an external heat exchanger employing the reaction gas as a carrier.

From the above it will be evident that in the modifications illustrated in Figs. 1, 2 and 3, in order to obtain the circulation of finely divided solid material as above described, it is important to maintain the finely divided solid material in a freely flowing, fluidized state, as previously described in connection with Fig. 1. To this end, an aerating or fluidizing gas may be introduced at any one or more points in the system wherein there is a tendency for the finely divided solids to separate from the gas and form a compact mass. For example, the conduit 63 leading from the reaction chamber and the conduit 68 leading to the reaction chamber may be provided with suitable pipes for introduction of a gaseous fluidizing agent therein. Also, the finely divided material may be passed from the chamber 67 into the main reaction chamber 42 by gravity. To prevent the carrier gas passing through line 66 in Fig. 2 from blowing upwardly through the heat exchanger 65, the conduit 63 should be of a height sufficient to develop a hydrostatic pressure greater than the pressure on the carrier gas in line 66. When this is done the hydrostatic pressure on the solid material developed in the line 63 may be sufficient to overcome the pressure drop on the powdered material being circulated.

From the above description, it will be apparent that in the modifications illustrated the temperature of a reaction is controlled within narrowly defined limits by employing a finely divided, fluidized mass of solid material rather than a liquid heat exchange medium.

Having described the preferred embodiment of the invention, it will be understood that it embraces such other variations and modifications as come within the spirit and scope thereof.

I claim:

1. A process for controlling reaction temperatures which comprises, carrying out the reaction in indirect heat exchange relationship with a relatively large body of finely divided solid material, passing a gas upwardly through said solids at a velocity adjusted to maintain a turbulent dense fluidized layer of solids on which is superposed a dispersed phase, the quantity of said fluidized solid material being sufficient to absorb relatively large amounts of heat with minimum rise in temperature whereby said fluidized solid serves as a relatively constant temperature bath, removing a stream of fluidized solid material from the dense layer into the top of a vertical column, keeping a fluidizing gas in admixture with the solid throughout the length of the column in an amount sufficient to maintain said solid in a freely flowing, fluidized state to develop thereby a fluid pressure sufficient to discharge the fluidized solid from the base of said column through a temperature modifying zone, modifying the temperature of the solid so discharged through said zone and returning it to said dense layer, thereby regulating the temperature of said dense layer to maintain said reaction temperature within predetermined limits.

2. A process for maintaining high temperature reactions within closely defined temperature limits which comprises, carrying out said reaction in indirect heat exchange relationship with a dense layer of finely divided solid material having a melting point above the desired reaction temperature, passing a gas upwardly through said solids at a velocity adjusted to maintain a turbulent dense fluidized layer of solids on which is superposed a dispersed phase, continuously removing a stream of fluidized solid material from said dense layer into the top of a vertical column, keeping a fluidizing gas in admixture with the solid so removed throughout the length of the column in an amount sufficient to maintain said solid in a freely flowing, fluidized state to develop thereby a fluid pressure sufficient to discharge the fluidized solid from the base of said column through a temperature modifying zone, modifying the temperature of the solid so discharged through said zone and returning it to said dense layer to regulate thereby the temperature of said dense layer and maintain said reaction temperature within the desired limits.

3. A process for controlling the temperatures of highly exothermic chemical reactions which comprises, carrying out said reactions in indirect heat exchange relationship with a dense layer of finely divided solid material having a melting point above the desired reaction temperature, passing a gas upwardly through said solids at a velocity adjusted to maintain a turbulent dense fluidized layer of solids on which is superposed a dispersed phase, continuously withdrawing a stream of fluidized solid material from said dense layer into the top of a vertical column, keeping a fluidizing gas in admixture with the solid throughout the length of the column in an amount sufficient to maintain said solid in a freely flowing, fluidized state to develop thereby a fluid pressure sufficient to discharge the fluidized solid from the base of said column through a cooling zone, cooling the solid so discharged through said zone and returning it to said dense layer to extract thereby heat from said dense layer and maintain said reaction temperature within the desired limits.

EGER V. MURPHREE.

REFERENCES CITED

The following references are of record in the file of this patent:

UNITED STATES PATENTS

| Number | Name | Date |
| --- | --- | --- |
| 1,402,336 | Backhaus | Jan. 3, 1922 |
| 1,747,676 | Kerr | Feb. 18, 1930 |
| 1,900,382 | Jaeger | Mar. 7, 1933 |
| 1,984,380 | Odell | Dec. 18, 1934 |
| 2,341,193 | Scheineman | Feb. 8, 1944 |
| 2,348,009 | Johnson et al. | May. 2, 1944 |
| 2,363,874 | Krebs | Nov. 28, 1944 |
| 2,373,008 | Becker | Apr. 3, 1945 |
| 2,377,935 | Gunness | June 12, 1945 |
| 2,412,025 | Zimmerman | Dec. 3, 1946 |